United States Patent
Ohashi et al.

(10) Patent No.: US 7,693,353 B2
(45) Date of Patent: Apr. 6, 2010

(54) IMAGE PROCESSING APPARATUS, METHOD OF THE SAME, AND PROGRAM FOR THE SAME

(75) Inventors: Hisashi Ohashi, Kanagawa (JP); Michitomo Kouda, Tokyo (JP); Daisuke Kuroda, Kanagawa (JP); Shuichi Ota, Saitama (JP); Hiroshige Yokoyama, Tokyo (JP)

(73) Assignee: Sony Corporation, Tokyo (JP)

( * ) Notice: Subject to any disclaimer, the term of this patent is extended or adjusted under 35 U.S.C. 154(b) by 971 days.

(21) Appl. No.: 11/416,119

(22) Filed: May 3, 2006

(65) Prior Publication Data
US 2006/0274146 A1 Dec. 7, 2006

(30) Foreign Application Priority Data
May 18, 2005 (JP) .............................. 2005-144905

(51) Int. Cl.
G06K 9/54 (2006.01)
(52) U.S. Cl. ....................................... 382/305
(58) Field of Classification Search ................. 382/284, 382/305, 309, 226; 348/113, 14.03, 116, 348/E5.105
See application file for complete search history.

(56) References Cited

U.S. PATENT DOCUMENTS 6,725,458 B2 * 4/2004 Shimotani et al. ........... 719/321
7,307,658 B2 * 12/2007 Mino ....................... 348/231.1
2003/0107654 A1 * 6/2003 Ohmura ................. 348/207.99

FOREIGN PATENT DOCUMENTS

| JP | 2001-216309 | | 8/2001 |
|---|---|---|---|
| JP | 2003-323440 | | 11/2003 |
| JP | 2004-072377 | A | 3/2004 |
| JP | 2004-088607 | A | 3/2004 |
| JP | 2004-112290 | A | 4/2004 |
| JP | 2005-073139 | A | 3/2005 |
| JP | 2005-110128 | A | 4/2005 |

OTHER PUBLICATIONS

Japanese Office Action issued Oct. 6, 2009 for corresponding Japanese Application No. 2005-144905.

* cited by examiner

Primary Examiner—Daniel G Mariam
(74) Attorney, Agent, or Firm—Rader, Fishman & Grauer PLLC (57) ABSTRACT

An image processing apparatus includes a storage unit configured to store sightseeing information in a storing unit, a detection unit configured to detect sightseeing information corresponding to a predetermined sightseeing site stored in the storing device, a display unit configured to display the sightseeing information detected by the detection means on a display unit, and an image-capturing unit configured to capture an image of an object. The storage unit links an image obtained as a result of capturing an image using the image-capturing unit to the sightseeing information detected by the detecting unit and stores the image.

9 Claims, 13 Drawing Sheets

IMAGE PROCESSING APPARATUS, METHOD OF THE SAME, AND PROGRAM FOR THE SAME

CROSS REFERENCES TO RELATED APPLICATIONS

The present invention contains subject matter related to Japanese Patent Application JP 2005-144905 filed in the Japanese Patent Office on May 18, 2005, the entire contents of which are incorporated herein by reference.

BACKGROUND OF THE INVENTION

1. Field of the Invention

The present invention relates to an image processing apparatus, a method of processing an image, and a program for processing an image. More specifically, the invention relates to a method of processing an image and a program for processing an image that enables a camera to easily access sightseeing information.

2. Description of the Related Art

There is a known technology for linking a captured image with a place name of the location where the image was captured and storing the image using an image-capturing apparatus. Such an image-capturing apparatus includes position detection devices, such as a map database and a global positioning system (GPS) (refer to Japanese Unexamined Patent Application Publication No. 2004-88607).

SUMMARY OF THE INVENTION

However, an image-capturing apparatus that is capable of linking an image photographed by a user with pre-stored information describing a predetermined location (for example, sightseeing information on a tourist attraction) is not proposed.

Accordingly, an embodiment of the present invention enables an image photographed by a user to be linked with sightseeing information and stored.

An image processing apparatus according to an embodiment of the present invention includes storage means for storing sightseeing information in a storage device, detection means for detecting sightseeing information corresponding to a predetermined sightseeing site stored in the storage device, display means for displaying the sightseeing information detected by the detection means on a display unit, and image-capturing means for capturing an image of an object, wherein the storage means links an image obtained as a result of capturing an image using the image-capturing means to the sightseeing information detected by the detection means and stores the image.

The storing device may be a hard disk.

The sightseeing information displayed on the display unit may include character information describing the predetermined sightseeing site and a template image corresponding to the predetermined sightseeing site.

The display means is capable of replacing the displayed template image with an image obtained as a result of capturing an image using the image-capturing means.

The image processing apparatus may further include position detection means for detecting a current position. The detection means is capable of detecting sightseeing information corresponding to the position detected by the position detection means.

The image processing apparatus may further include acquisition means for fully or selectively obtaining sightseeing information from an external device storing sightseeing information.

A method of image processing according to an embodiment of the present invention includes the steps of storing sightseeing information in a storing device, detecting sightseeing information corresponding to a predetermined sightseeing site stored in the storing device, displaying the sightseeing information detected in the detecting step on a display unit, and capturing an image of an object, wherein, in the storing step, an image obtained as a result of capturing an image in the capturing step is linked to the sightseeing information detected in the detecting step and is stored.

A program according to an embodiment of the present invention includes the steps of storing sightseeing information in a storing device, detecting sightseeing information corresponding to a predetermined sightseeing site stored in the storing device, displaying the sightseeing information detected in the detecting step on a display unit, and capturing an image of an object, wherein, in the storing step, an image obtained as a result of capturing an image in the capturing step is linked to the sightseeing information detected in the detecting step and is stored.

According to the image processing apparatus, a method of processing an image, and a program for processing an image according to embodiments of the present invention, sightseeing information is stored in a storing device, sightseeing information corresponding to a predetermined sightseeing site is detected in the storing device, display of the detected sightseeing information is displayed on a display unit, an image of an object is captured, and the image obtained by capturing an image of an object is linked to the detected sightseeing information and is stored.

According to embodiments of the present invention, an image photographed by a user can be linked to sightseeing information and stored.

DESCRIPTION OF THE PREFERRED EMBODIMENTS

Before describing embodiments of the present invention, the correspondence between the features of the claims and the specific elements disclosed in an embodiment of the present invention is discussed below. This description is intended to assure that an embodiment supporting the claimed invention is described in this specification. Thus, even if an element in the following embodiments is not described as relating to a certain feature of the present invention, that does not necessarily mean that the element does not relate to that feature of the claims. Conversely, even if an element is described herein as relating to a certain feature of the claims, that does not necessarily mean that the element does not relate to other features of the claims.

Furthermore, this description should not be construed as restricting all the aspects of the invention disclosed in the embodiments that are described in the claims. That is, the description does not deny the existence of aspects of the present invention that are described in the embodiments but are not claimed in the invention of this application, i.e., the existence of aspects of the present invention that in the future may be claimed by a divisional application or that may be additionally claimed through amendments.

An embodiment of the present invention provides an image processing apparatus including storage means (for example, a CPU 11 shown in FIG. 2) for storing sightseeing information in a storage device (for example, a hard disk 14 shown in FIG. 2), detection means (for example, a CPU 11 shown in FIG. 2) for detecting sightseeing information corresponding to a predetermined sightseeing site stored in the storage device, display means (for example, a CPU 11 shown in FIG. 2) for displaying the sightseeing information detected by the detection means on a display unit (for example, a LCD panel 10 shown in FIG. 2), and image-capturing means (for example, a camera unit 21 shown in FIG. 2) for capturing an image of an object, wherein the storage means links an image obtained as a result of capturing an image using the image-capturing means to the sightseeing information detected by the detection means and stores the image.

Figure 2:
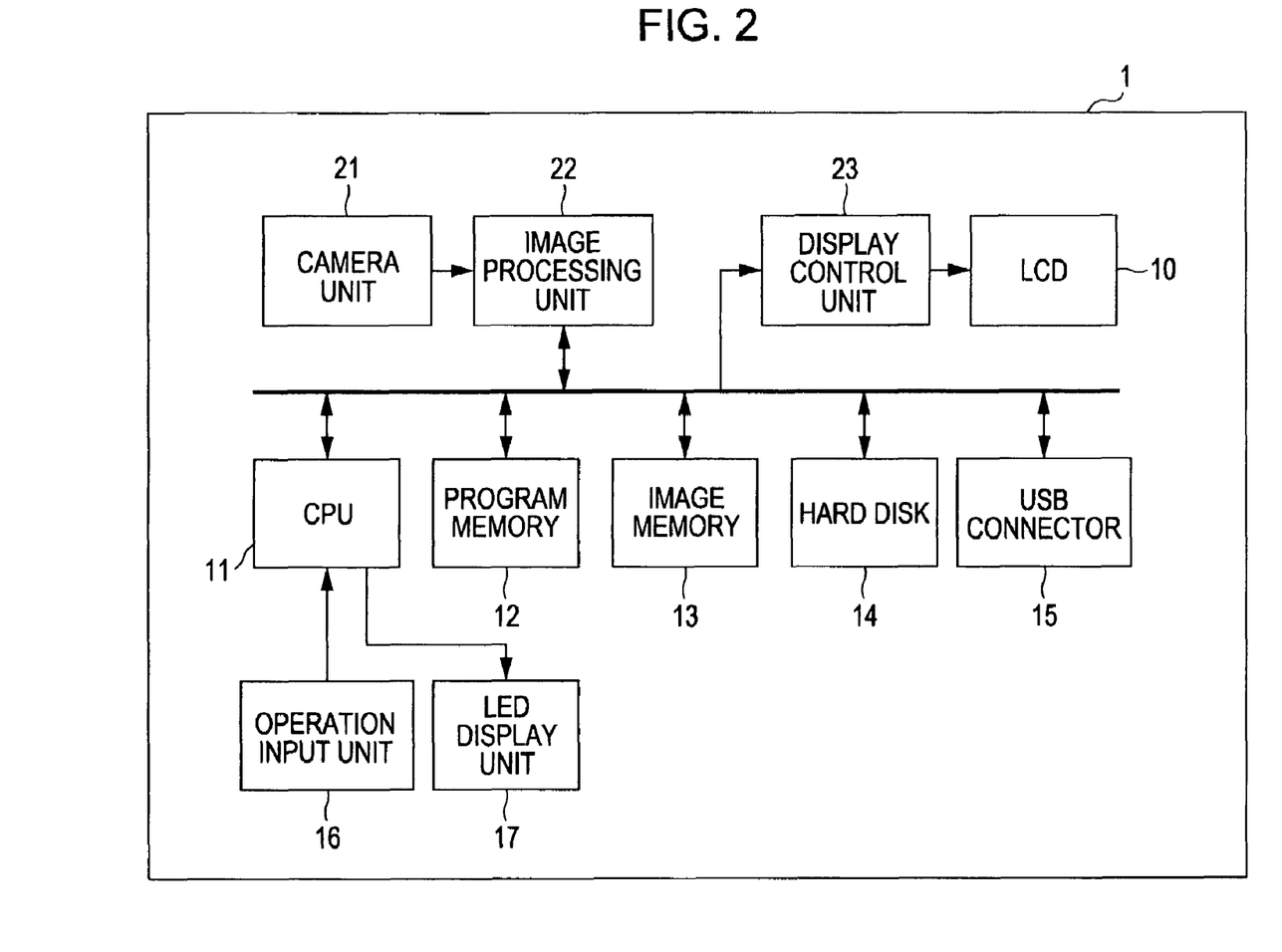
FIG. 2 illustrates the inside of the camera.

Another embodiment of the present invention provides an image processing apparatus, wherein the storage device is a hard disk (for example, the hard disk 14 shown in FIG. 2).

Figure 6:
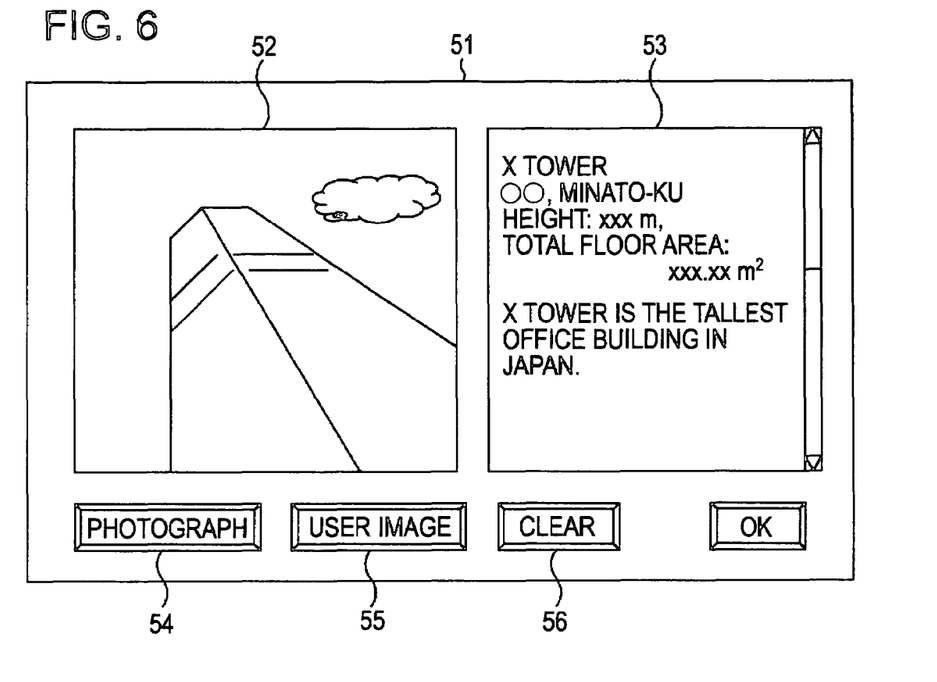
FIG. 6 illustrates an example sightseeing information display screen.

Another embodiment of the present invention provides an image processing apparatus, wherein the sightseeing information displayed on the display unit includes character information (for example, a sightseeing description display in a display area 53 shown in FIG. 6) describing the predetermined sightseeing site and a template image (for example, a template image display in a display area 52 shown in FIG. 6) corresponding to the predetermined sightseeing site.

Figure 8:
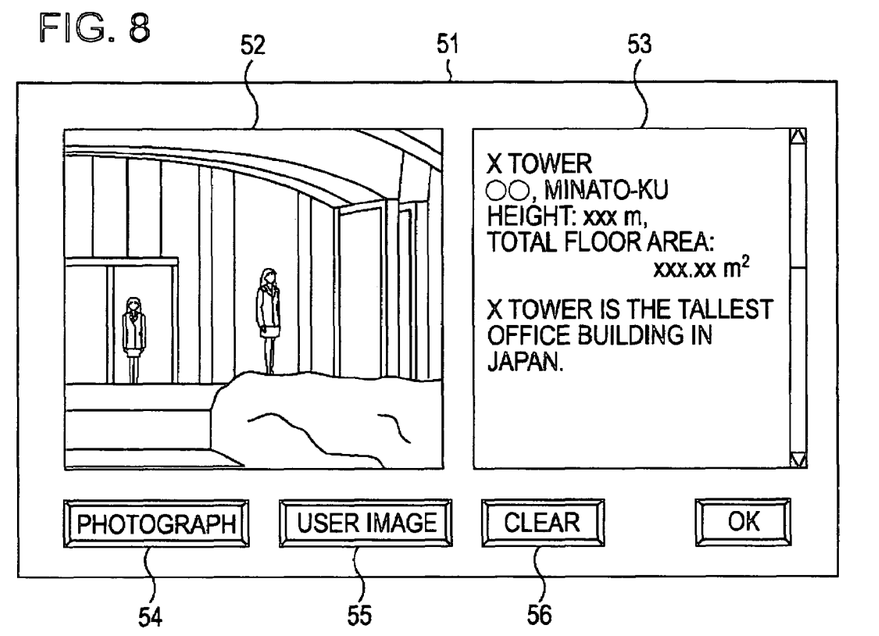
FIG. 8 illustrates another example sightseeing information display screen.

Another embodiment of the present invention provides an image processing apparatus, wherein the display means replaces the displayed template image with an image (for example, the image displayed in the display area 52 shown in FIG. 8) obtained as a result of capturing an image using the image-capturing means.

Another embodiment of the present invention provides an image processing apparatus further including position detection means (for example, a position detection unit 102 shown in FIG. 10) for detecting a current position, wherein the detection means detects sightseeing information corresponding to the position detected by the position detection means.

Another embodiment of the present invention provides an image processing apparatus further including acquisition means (for example, a USB connector 15) for fully or selectively obtaining sightseeing information from an external device storing sightseeing information.

A method of image processing and a program executable by a processor controlling an image processing apparatus configured to store an image obtained as a result of capturing an image both include the steps of storing sightseeing information in a storing device, detecting sightseeing information corresponding to a predetermined sightseeing site stored in the storing device, displaying the sightseeing information detected in the detecting step on a display unit, and capturing an image of an object, wherein, in the storing step, an image obtained as a result of capturing an image in the capturing step is linked to the sightseeing information detected in the detecting step and is stored.

Figures 1, 1A:
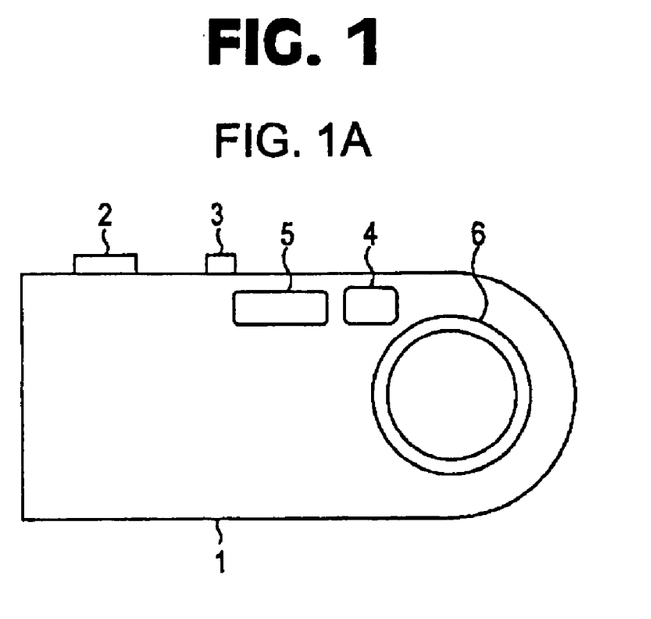
FIG. 1 illustrates an external view of a camera according to an embodiment of the present invention.
Figure 1B:
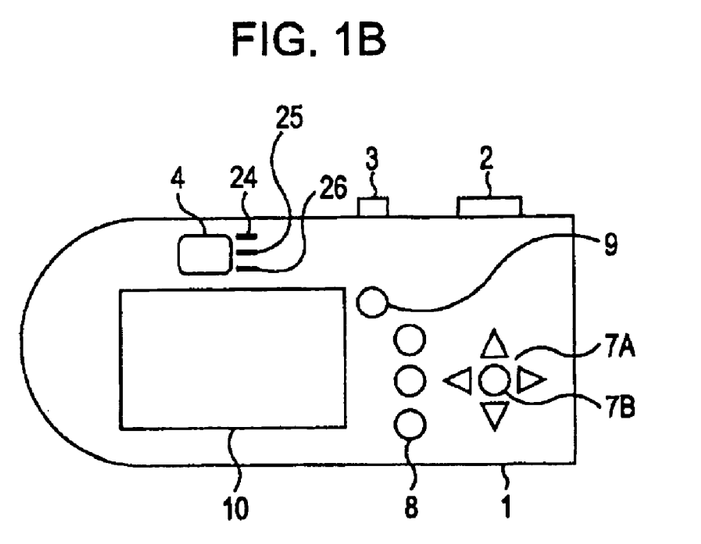

FIGS. 1A and 1B illustrate an external view of a digital still camera 1 according to an embodiment of the present invention. Hereinafter, the digital still camera 1 is simply referred to as "camera 1."

As shown in FIG. 1A, the camera 1 includes a shutter button (release button) 2, a power switch button 3, an optical viewfinder 4, a flash 5, and an imaging lens 6.

As shown in FIG. 1B, the camera 1 also includes cursor movement buttons 7A, a selection button 7B, a sightseeing information display button 8, an electronic view panel display switch button 9 (hereinafter referred to as an "LCD panel display switch button 9"), a liquid crystal display (LCD) panel 10, an auto focus (AF) confirmation light-emitting diode 11, a tally light-emitting diode 25, and a strobe charge confirmation light-emitting diode 26.

FIG. 2 illustrates the electric structure of the camera 1.

A central processing unit (CPU) 11 executes programs stored in a program memory 12 and controls the overall operation of the camera 1.

An image memory 13 stores image data obtained as a result of capturing an image by the camera 1.

A hard disk 14 stores sightseeing information, which is described below.

A universal serial bus (USB) connector 15 is an interface for connecting the camera 1 with an external information apparatus. The USB connector 15 is used to transmit captured images stored on the hard disk 14 to an external information apparatus connected to the USB connector 15 or to receive data (sightseeing information) from an external information apparatus connected to the USB connector 15.

An operation input unit 16 detects the pressing operation of a button, such as the shutter button 2, the power switch button 3, the cursor movement buttons 7A, the selection button 7B, or the sightseeing information display button 8, and notifies the CPU 11.

A light-emitting diode (LED) display unit 17 is provided, for example, near the optical viewfinder 4 and the LCD panel 10. According to this embodiment, the LED display unit 17 includes the AF confirmation light-emitting diode 24, the tally light-emitting diode 25, and the strobe charge confirmation light-emitting diode 26.

The LED display unit 17 is electrically connected to the CPU 11. The AF confirmation light-emitting diode 24, usually, illuminates when successful focusing is carried out when a user presses the shutter button 2 halfway and blinks when focusing is unsuccessful.

A camera unit 21 includes a lens, a charge-coupled device (CCD), an analog signal processor, and an analog-to-digital (A/D) converter and transmits image data obtained as a result of capturing an image to an image processing unit 22.

The image processing unit 22 uses the image memory 13 to carry out image processing, such as gamma conversion, color-space conversion, and white balancing, on the image data supplied from the camera unit 21, and, at the same time, if necessary, carries out Joint Photographic Experts Group (JPEG) compression processing on the obtained image data. Then, the image processing unit 22 stores the processed image data on the hard disk 14 via the CPU 11. The image processing unit 22 carries out JPEG decompression processing on JPEG compressed image data stored on the hard disk 14 and supplies the decompressed image data to a display control unit 23 via the CPU 11.

The display control unit 23 converts the image data supplied via the CPU 11 into a RGB signal and supplies the RGB signal to the LCD panel 10 for display.

Next, the process for displaying sightseeing information will be described with reference to the flow chart shown in FIG. 3.

Figure 3:
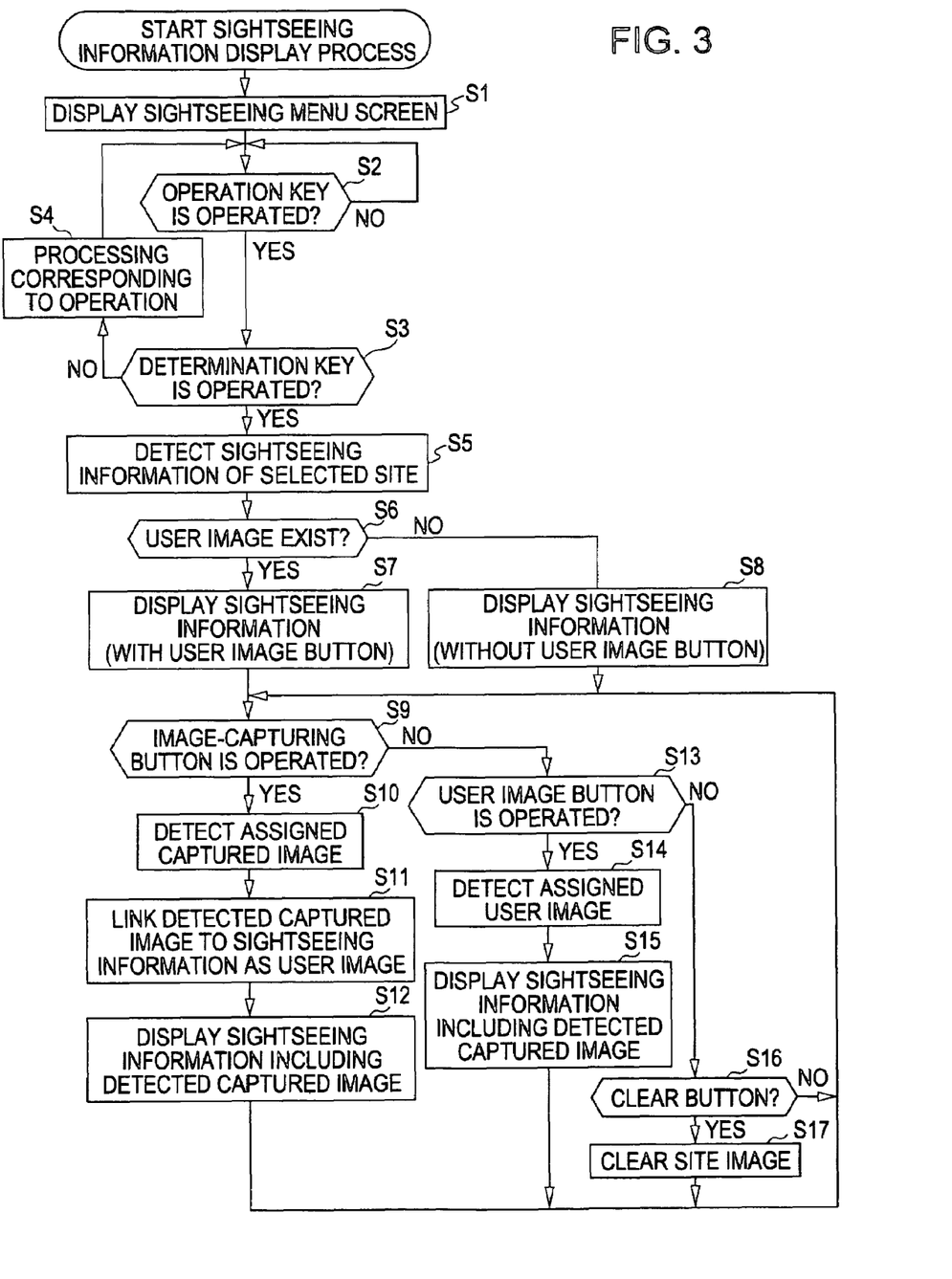
FIG. 3 illustrates a flow chart for a sightseeing information display process.
Figure 4A:
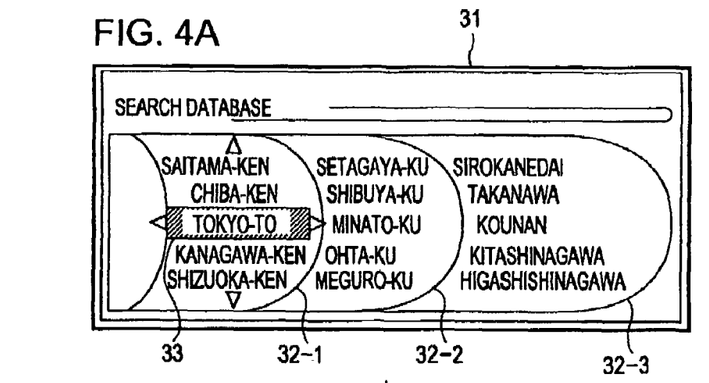
FIG. 4 illustrates an example sightseeing menu display screen.

In Step S1, if the sightseeing information display button 8 of the camera 1 is operated by the user, the CPU 11 controls the display control unit 23 to display a sightseeing menu screen 31, such as that shown in FIG. 4A, on the LCD panel 10. This process is described as "the CPU 11 displaying an image on the LCD panel 10."

In Step S2, the CPU 11 is in a stand-by mode until the sightseeing menu screen 31 is operated. When the sightseeing menu screen 31 is operated, the process proceeds to Step S3. In Step S3, it is determined whether or not the operation is that for determining a sightseeing site is carried out. If the operation is determined not to be that for determining a sightseeing site, the process proceeds to Step S4. In Step S4, processing corresponding to the operation is carried out.

The sightseeing menu screen 31 shown in FIGS. 4A to 4D includes three display units 32 (for example, in FIG. 4A, the sightseeing menu screen 31 includes display units 32-1 to 32-3). The display units 32 display place names. The place names displayed in the left display area 32 correspond to extensive regions; the place names displayed in the middle display area 32 correspond to narrower regions; and place names displayed in the right display area 32 correspond to even more narrower regions.

The display area 32-1 that is first displayed on the sightseeing menu screen 31, as shown in FIG. 4A, displays Japanese prefecture names. The display area 32-2 displays ward names or city names of the currently selected prefecture (wherein, in FIG. 4A, Tokyo-to (Tokyo Metropolis) is the currently selected prefecture). In the display area 32-3, town names of a predetermined ward or city (i.e., "Minato-ku" in FIG. 4A,) are displayed.

The user operates the cursor movement buttons 7A to move a cursor 33 that is located on the display area 32-1 onto a place name in the display area 32-2 to obtain sightseeing information corresponding to the place name.

Figure 4B:
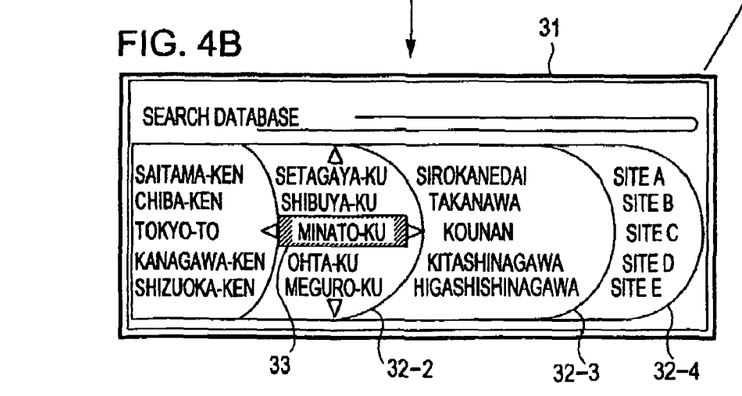

For example, if the cursor 33 is moved onto "Minato-ku" displayed in the display area 32-2, as shown in FIG. 4B, the display area 32-2 is moved to the left, the display area 32-3 is moved to the middle, and a display area 32-4 displaying specific place names and building names, i.e., names of the sightseeing site, is displayed on the right.

The user operates the cursor movement buttons 7A to move the cursor 33 that is currently on the display area 32-2 onto one of the place names corresponding to predetermined sightseeing sites listed in the display area 32-3.

Figure 4C:
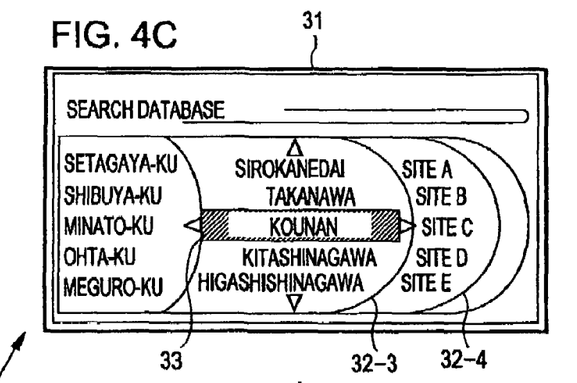

For example, if the cursor 33 is moved onto "Konan" in the display area 32-3, as shown in FIG. 4C, the display area 32-3 is moved to the left, and, then, the display area 32-4 is moved to the middle.

The user operates the cursor movement buttons 7A to move the cursor 33 from the display area 32-3 onto a predetermined sightseeing site in the display area 32-4 corresponding to the desired sightseeing information.

Figure 4D:
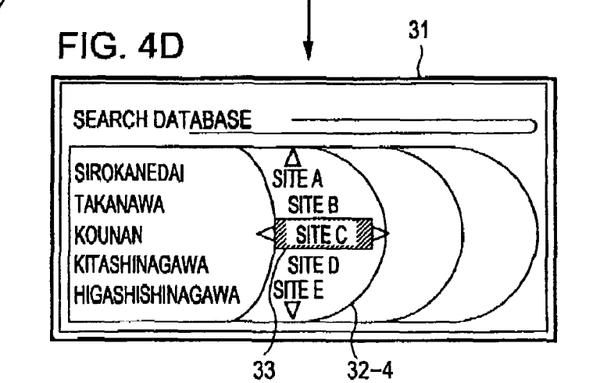

For example, when the cursor 33 is moved onto "Site C" in the display area 32-4, as shown in FIG. 4D, the display area 32-4 is moved to the left.

In other words, in Step S4, processing for changing the display of the sightseeing menu screen 31, as shown in FIGS. 4A to 4D, in accordance with the operation of the cursor movement buttons 7A is carried out.

In Step S3, if it is determined that a sightseeing site is selected, the process proceeds to Step S5. In Step S5, the CPU 11 reads out sightseeing information on the selected sightseeing site from the hard disk 14.

For example, as shown in FIG. 4D, when the selection button 7B is operated while the cursor 33 is on "Site C" in the display area 32-4, the CPU 11 reads out the sightseeing information corresponding to Site C from the hard disk 14.

Figure 5:
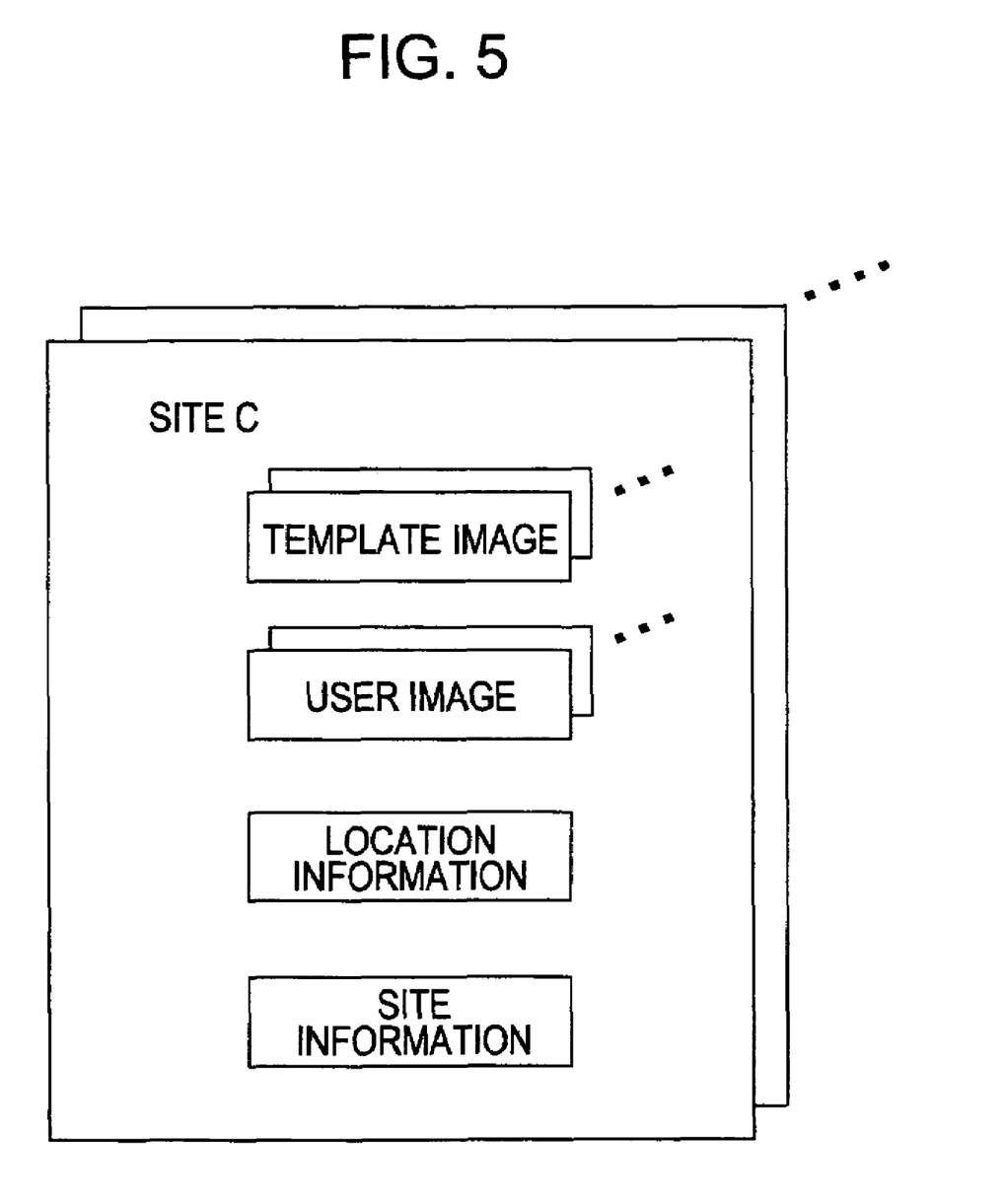
FIG. 5 illustrates sightseeing information stored in a hard disk shown in FIG. 2.

The hard disk 14 stores sightseeing information corresponding to each sightseeing site including Site C, as shown in FIG. 5.

A template image included in the sightseeing information is a predetermined image describing a site (for example, an image such as that on a postcard).

A user image is an image linked to a predetermined set of sightseeing information, as described below, and, for example, is an image photographed by the user.

Location information includes information on the location of the site, such as longitude, latitude, and altitude. The site information is information describing the site, such as the name, address, and contact information of the site and, moreover, the history of the site and/or the local industry at the site.

In Step S6 in FIG. 3, the CPU 11 determines whether or not a user image is included in the sightseeing information read out in Step S5. If the CPU 11 determines that a user image is included, the process proceeds to Step S7. In Step S7, a sightseeing information screen 51, as shown in FIG. 6, is displayed.

In a display area 52 of the sightseeing information screen 51, as shown in FIG. 6, a template image or a user image is displayed. In a display area 53, the content of the sightseeing information is displayed.

A photograph button 54 is operated to display an image photographed by the user (for example, the last photographed image) in the display area 52. A user image button 55 is operated to display a user image in the display area 52. A clear button 56 is operated to clear the image displayed in the display area 52.

In Step S6, if it is determined that a user image is not included, the process proceeds to Step S8. In Step S8, the CPU 11 displays a sightseeing information screen 51, as shown in FIG. 7.

Figure 7:
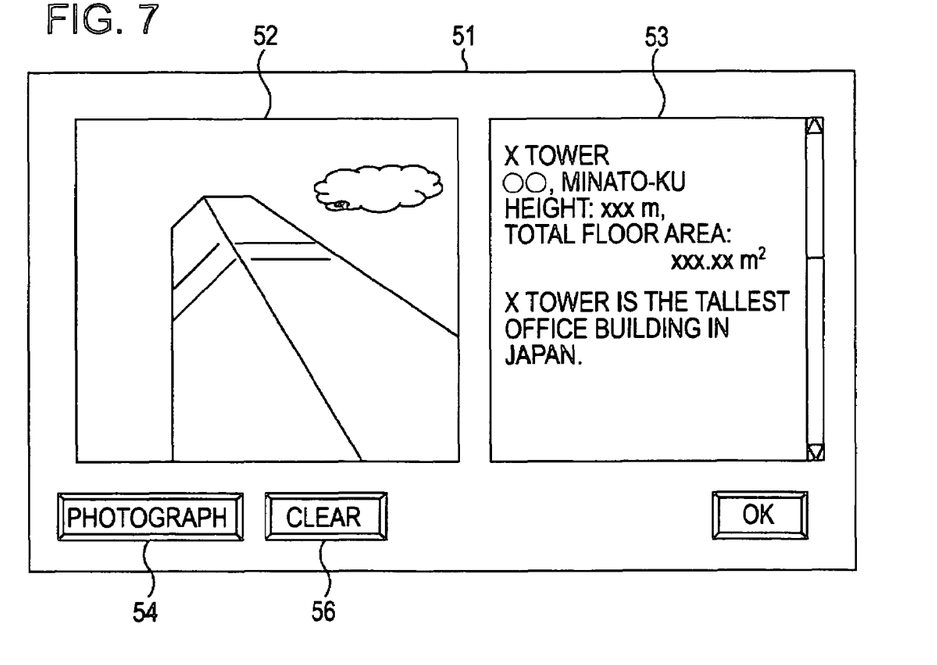
FIG. 7 illustrates another example sightseeing information display screen.

The sightseeing information screen 51 that is shown in FIG. 7 does not include the user image button 55. The other parts of this sightseeing information screen 51 are the same as those of the sightseeing information screen 51 shown in FIG. 6.

When the sightseeing information screen 51 is displayed in Step S7 or S8, the process proceeds to Step S9. In Step S9, the CPU 11 determines whether or not the photograph button 54 in the sightseeing information screen 51 has been operated. If the CPU 11 determines that the photograph button 54 has been operated, the process proceeds to Step S10.

In Step S10, the CPU 11 detects an assigned captured image and, in Step S11, links the captured image, as a user image, to sightseeing information and stores this linked user image on the hard disk 14 (FIG. 5). When linking an image photographed by the user, the date and time when the image was photographed can also be linked and stored on the hard disk 14.

In Step S12, the CPU 11 displays the image (i.e., user image) in the display area 52 of the sightseeing menu screen 31.

For example, if the image displayed in the display area 52 is a template image, as shown in FIG. 6, the image displayed in the display area 52 will be replace by an image photographed by the user, as shown in FIG. 8.

In Step S9, if it is determined that the photograph button 54 has not been operated, the process proceeds to Step S13. In Step S13, the CPU 11 determines whether or not the user image button 55 has been operated. If it is determined that the user image button 55 has been operated, the process proceeds to Step S14. The user image button 55 may not be operated when the sightseeing information screen 51 (FIG. 7) is displayed in Step S8.

In Step S14, the CPU 11 detects a predetermined user image in the sightseeing information. In Step S15, the detected image is displayed so as to replace the currently displayed image (for example, a template image) and is displayed on the display area 52.

Figure 9:
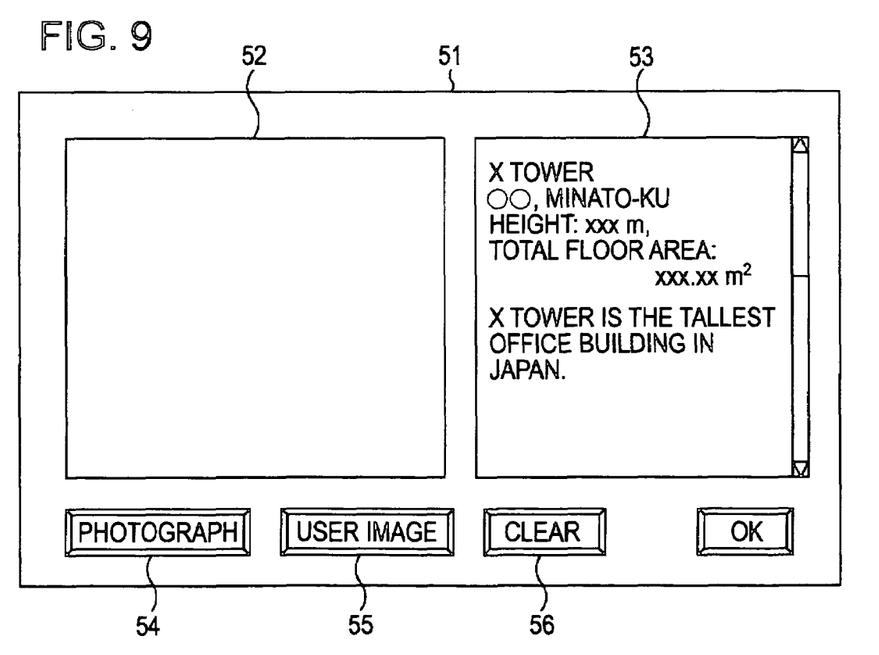
FIG. 9 illustrates another example sightseeing information display screen.

In Step S13, if it is determined that the user image button 55 has not been operated, the process proceeds to Step S16. In Step S16, the CPU 11 determines whether or not the clear button 56 has been operated. If the CPU 11 determines that the clear button 56 has been operated, the process proceeds to Step S17. In Step S17, the image displayed in the display area 52 is cleared, as shown in FIG. 9.

In Step S16, if it is determined that the clear button 56 has not been operated, the process returns to Step S9, and the subsequent steps are carried out.

As described above, since sightseeing information is stored in the camera 1, for example, sightseeing information on a site that the user wants to photograph can be easily obtained on site.

Since the sightseeing information and the photographed image can be linked and stored, information on where the image was photographed can be easily obtained later, and, for example, the images can be easily indexed later.

Since a user image is displayed so as to replace a template image, whether or not an image of the site has already been photographed can be easily confirmed. Furthermore, a unique guide book or a photo album can be easily produced.

According to the description above, a still image is linked to sightseeing information. However, instead, a moving image may be linked to sightseeing information and stored.

Figure 10:
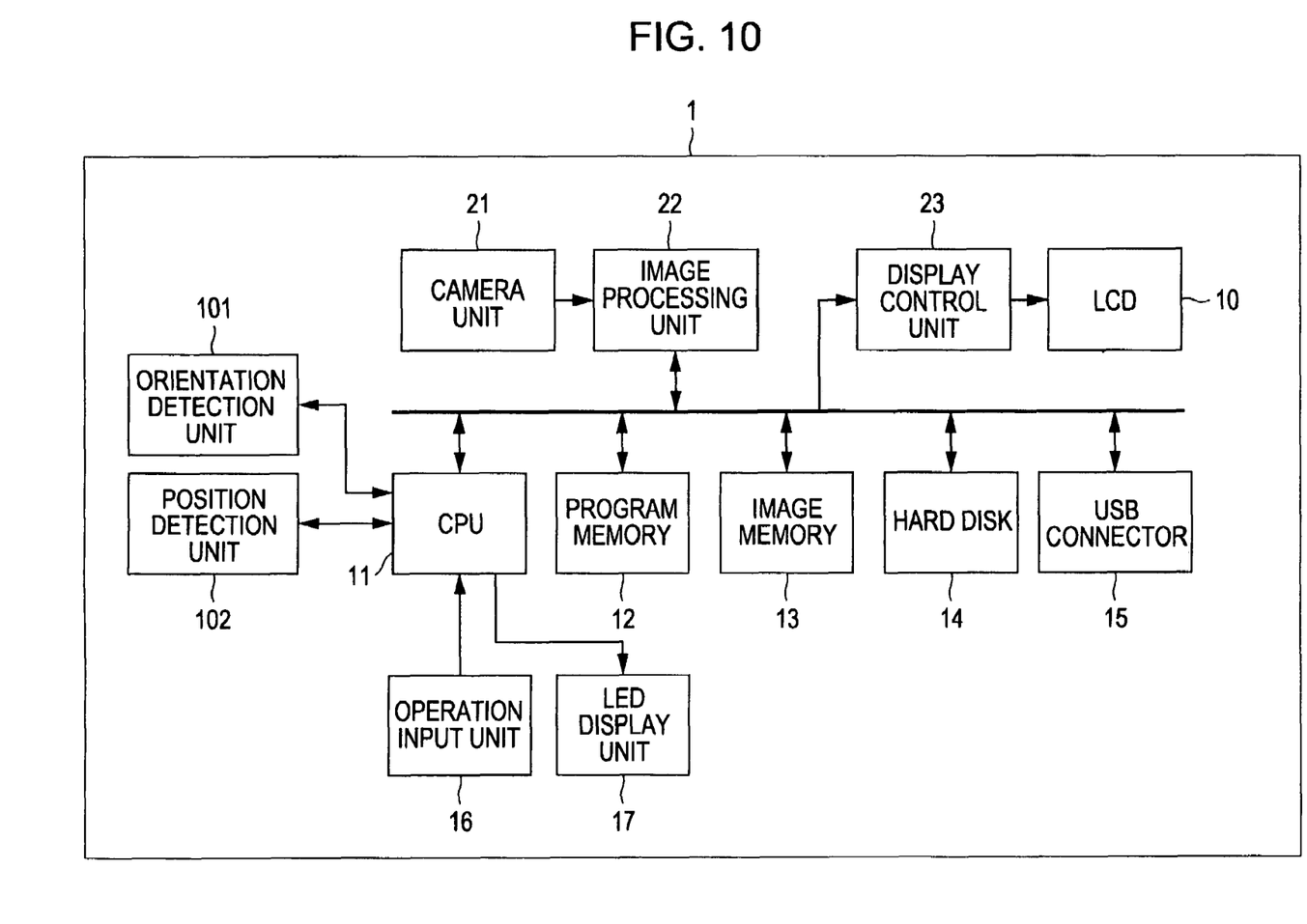
FIG. 10 illustrates the inside of a camera according to another embodiment.

FIG. 10 illustrates the electrical structure of a camera 1 according to another embodiment of the present invention. The camera 1 according to this embodiment has the same structure as that shown in FIG. 2, except that an orientation detection unit 101 and a position detection unit 102 are included. Other components included in the camera 1 according to this embodiment are the same as those included in the camera 1 shown in FIG. 2.

The orientation detection unit 101 includes an orientation sensor that detects geomagnetism as X and Y components and converts the geomagnetic vector into an electrical signal. The orientation detection unit 101 is electrically connected to a CPU 11 and supplies the detected orientation information to the CPU 11.

The position detection unit 102 includes a GPS receiver. The position detection unit 102 measures the current position on the basis of the distance to an orbit of a plurality of satellites by determining the distance to the orbit by measuring the time required for an electrical wave emitted from each satellite to reach a predetermined reception point.

Next, the process for displaying sightseeing information according to this embodiment will be described with reference to the flow chart shown in FIG. 11.

In Step S21, if the user operates a sightseeing information display button 8 of the camera 1, the CPU 11 controls the position detection unit 102 to determine the current position.

Figure 12:
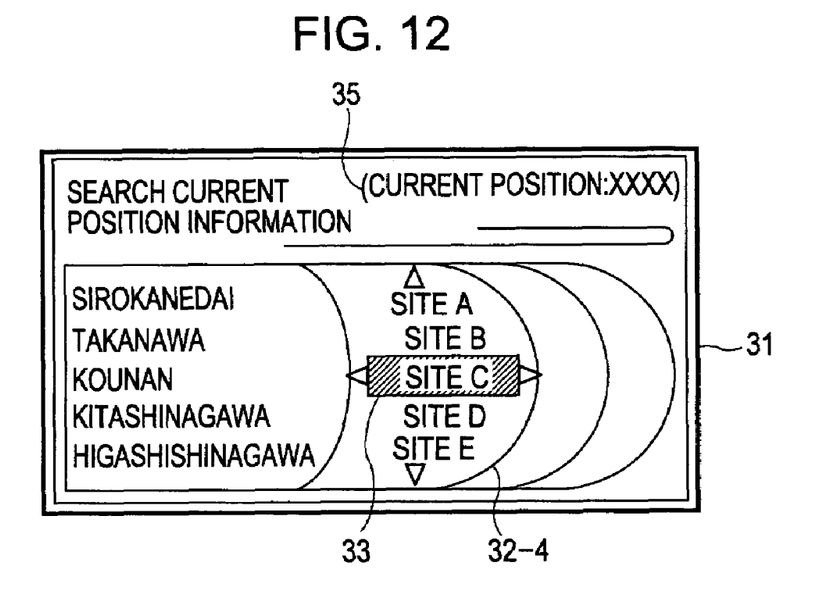
FIG. 12 illustrates an example sightseeing menu display screen.

Subsequently, in Step S22, the CPU 11 displays a sightseeing menu screen 31 corresponding to the current position, as shown in FIG. 12.

FIG. 12 shows an example of the sightseeing menu screen 31 including a display area 35 for displaying the latitude and longitude of the current position and a display area 34-4 including sites of the current location "Konan."

The processes from Step S23 to Step S38 are the same as those of Steps S2 to S17 shown in FIG. 3. Therefore, descriptions of these processes are not repeated here.

Figure 11:
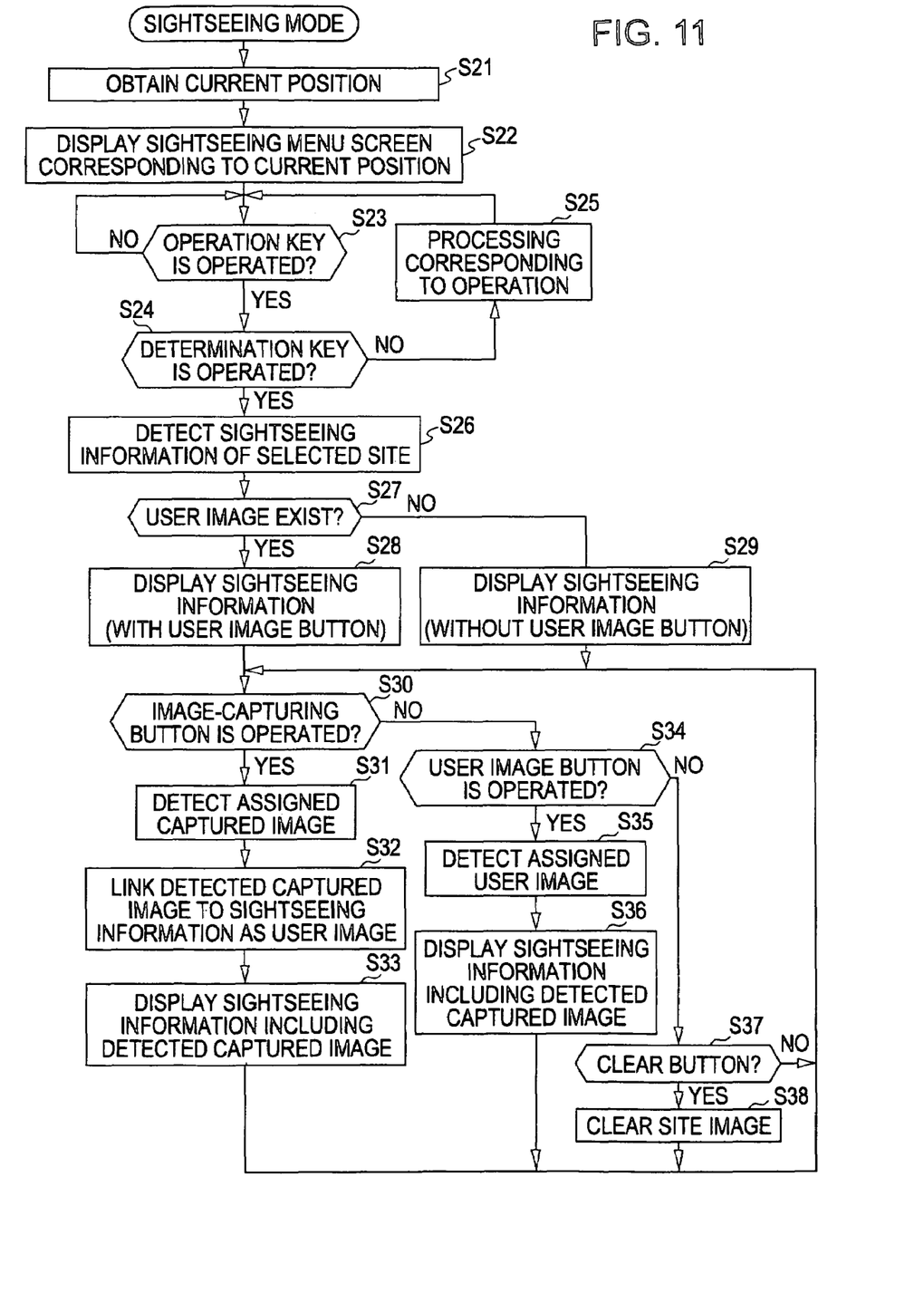
FIG. 11 illustrates a flow chart for another sightseeing information display process.
Figure 13:
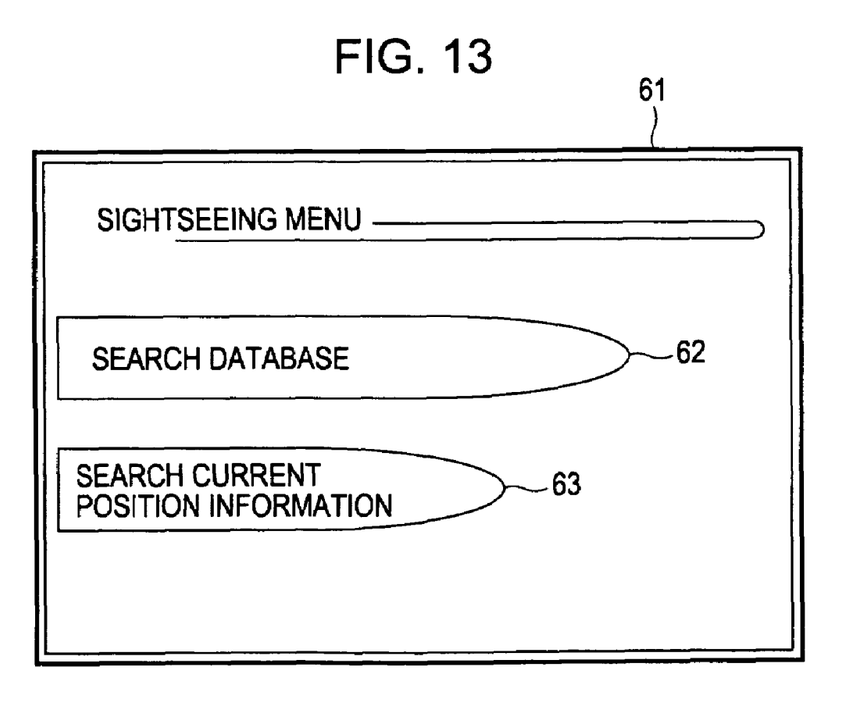
FIG. 13 illustrates another example sightseeing menu display screen.

As described above, the processes for displaying sightseeing information shown in FIGS. 4 and 11 are carried out as independent processes. However, these processes may be selectively carried out. In such a case, for example, first, an initialization screen 61, as shown in FIG. 13, is displayed. Then, if a button 62 is operated, the process shown in FIG. 4 is carried out, whereas, if a button 63 is operated, the process shown in FIG. 11 is carried out.

Figure 14:
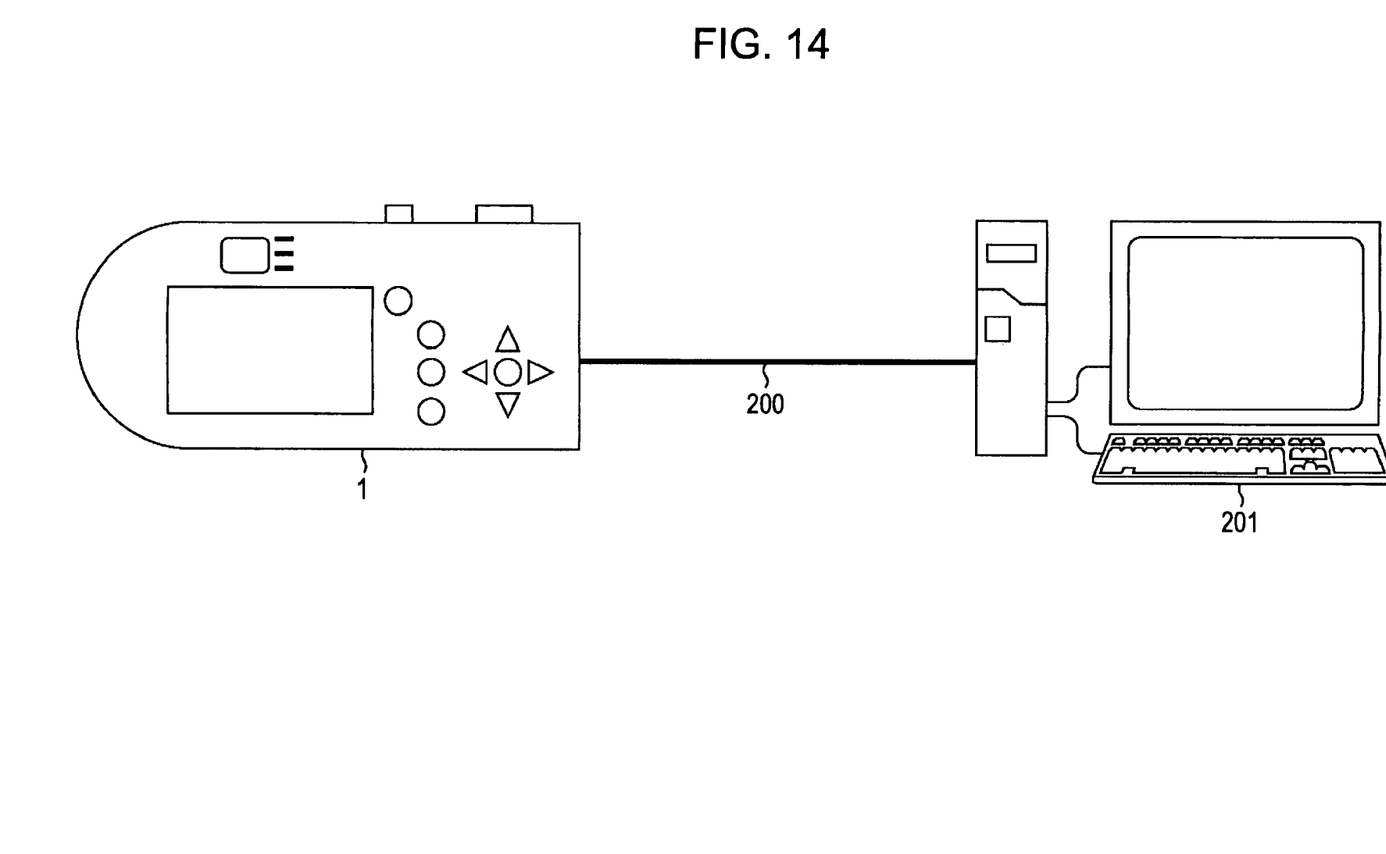
FIG. 14 illustrates an installation process of sightseeing information.

In such a case, the sightseeing information is installed using a personal computer (PC) 201 connected to the camera 1 via an USB cable 200, as shown in FIG. 14.

Figure 15:
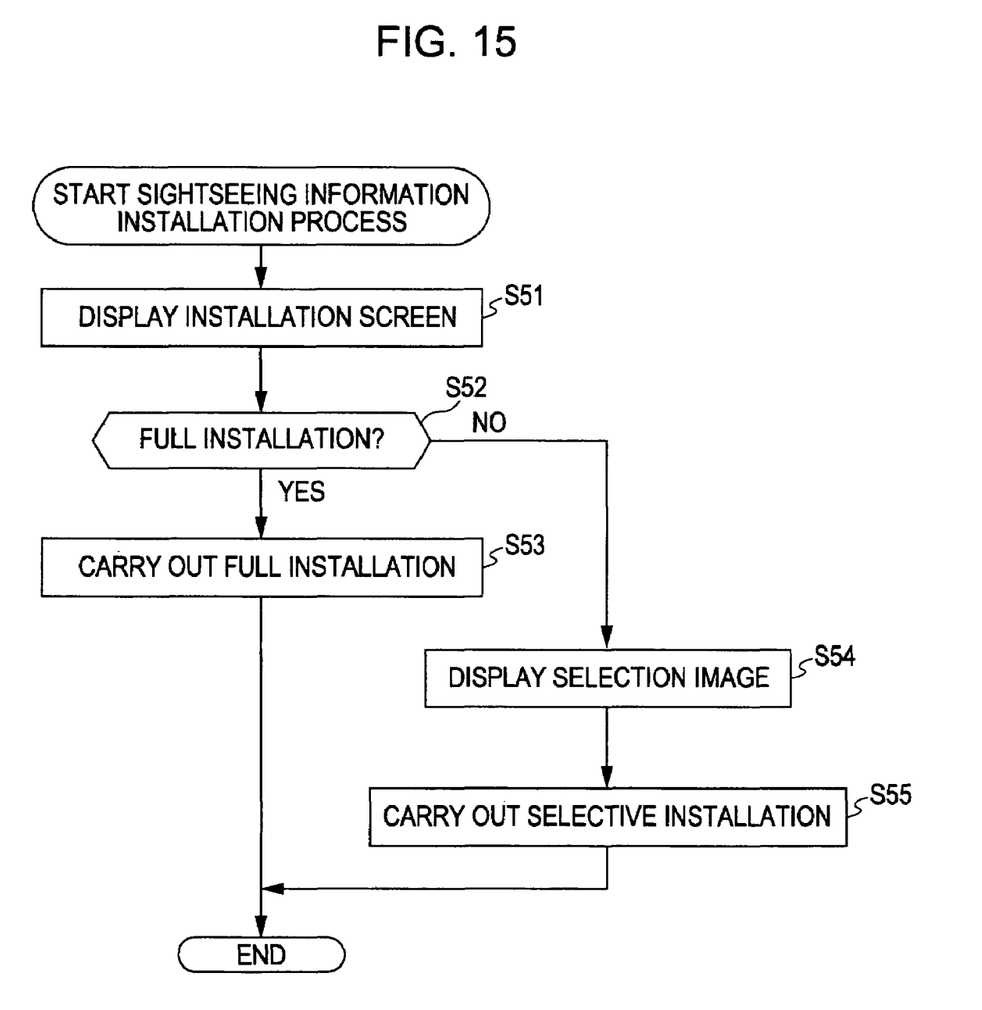
FIG. 15 illustrates a flow chart of an installation process of sightseeing information.

The operation of the PC 201 while installing sightseeing information is described with reference to the flow chart shown in FIG. 15.

In Step S51, the PC 201 displays an installation screen in the display area. Then, in Step S52, it is determined whether or not a full installation is to be carried out.

For example, in a case where the PC 201 stores sightseeing information on the whole country of Japan, it is determined whether or not all items of this sightseeing information is to be installed onto the camera 1.

The installation screen, which is not shown in the drawings, includes a button that is operated to carry out a full installation and another button that is operated to carry out a selective installation.

In Step S52, if it is determined that a full installation is to be carried out (i.e., if the button for full installation is operated), the process proceeds to Step S53. In Step S53, the PC 201 supplies, for example, all items of the sightseeing information corresponding to the whole country of Japan to the hard disk 14.

In Step S52, if it is determined that a full installation is not to be carried out (i.e., if the other button for selective installation is operated), the process proceeds to Step S54. In Step S54, the PC 201 displays a screen for selectively installing sightseeing information. Through this screen, which is not shown in the drawings, a predetermined prefecture, city, or town can be selected.

In Step S55, the PC 201 supplies sightseeing information corresponding to a predetermined region selected from the screen displayed in Step S54 to the camera 1 via the USB cable. The camera 1 stores the sightseeing information supplied from the PC 201 on the hard disk 14.

As describe above, since sightseeing information can be selectively installed to the camera 1, the capacity of the hard disk 14 of the camera 1 that is used can be adjusted. As a result, sightseeing information can be stored as much as possible when using the camera 1 mainly to refer to sightseeing information, or the amount of sightseeing information stored on the hard disk 14 can be limited when the camera 1 is to be mainly used for capturing images.

In the description above, the operation to select whether sightseeing information is fully installed or selectively installed is carried out at the PC 201. However, this operation may instead be carried out at the camera 1.

The processes described above can be executed by specialized hardware or software. When the processes are executed by software, for example, the processes may be carried out by executing a program by a personal computer, such as that shown in FIG. 16.

Figure 16:
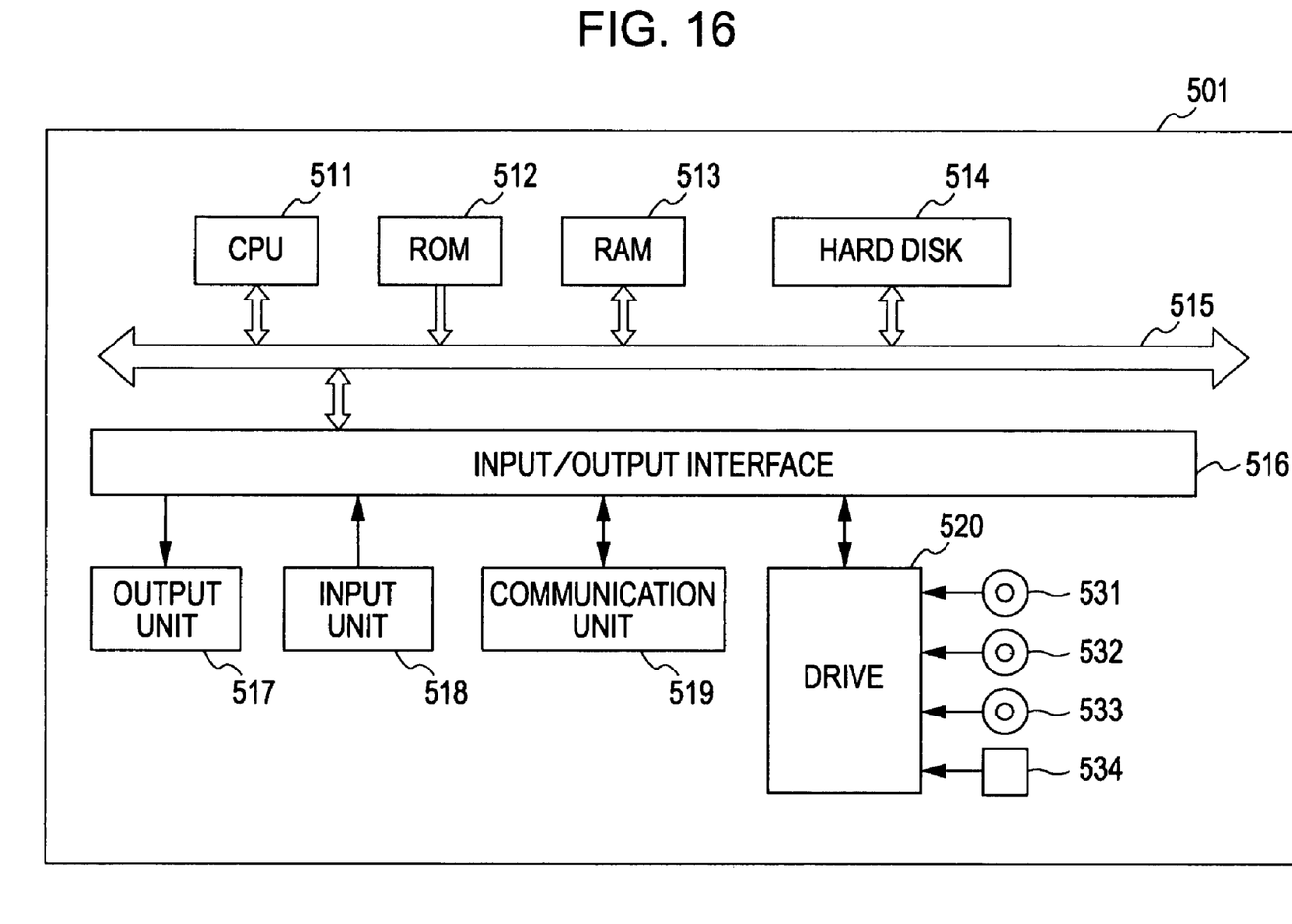
FIG. 16 illustrates a block diagram of a personal computer according to an embodiment of the present invention.

In FIG. 16, a CPU 511 carries out various operations by executing programs stored on a read only memory (ROM) 512 or programs loaded from a hard disk 514 into a random access memory (RAM). Data used for the CPU 511 to carry out various operations is stored on the RAM 513.

The CPU 511, the ROM 512, and the RAM 513 are connected to each other via a bus 515. The bus 515 is connected to an input/output interface 516.

The input/output interface 516 is connected to an input unit 518, an output unit 517, and a communication unit 519. The input unit 518 includes a keyboard, a mouse, and input terminals. The output unit 517 includes a display unit constructed of a cathode ray tube (CRT) and a liquid crystal display (LCD), and it also includes output terminals and a speaker. The communication unit 519 includes a terminal adaptor, an asymmetric digital subscriber line (ADSL) modem, a local area network (LAN) card, and so on. The communication unit 519 carries out communication processing through various networks, such as the Internet.

The input/output interface 516 also is connected to a drive 520. A magnetic disk 531, such as a flexible disk, a optical disk 532, such as a compact disk-read only memory (CD-ROM) or a digital versatile disk (DVD), a magneto-optical disk 533, such as mini disk (MD), or a removable medium (recording medium) 534 can be loaded into the input/output interface 516. Computer programs read out from such media are installed to the hard disk 514, when desired.

The steps included in the process described with reference to the flow charts do not have to be chronologically carried out in the order shown in the flow chart. Moreover, the steps do not have to be carried out in a chronological order but, instead, may be carried out simultaneously or individually.

It should be understood by those skilled in the art that various modifications, combinations, sub-combinations and alterations may occur depending on design requirements and other factors insofar as they are within the scope of the appended claims or the equivalents thereof.

What is claimed is:

1. An image processing apparatus comprising:
    storage means for storing sightseeing information in a storing device;
    detection means for detecting sightseeing information corresponding to a predetermined sightseeing site stored in the storing device;
    display means for displaying the sightseeing information detected by the detection means on a display unit; and
    image-capturing means for capturing an image of an object,
    wherein the storage means links an image obtained as a result of capturing an image using the image-capturing means to the sightseeing information detected by the detection means and stores the image and
    wherein the storage means stores the sightseeing information in a series of hierarchical menus including a high level hierarchical menu, an intermediate level hierarchical menu and a low level hierarchical menu such that the high level hierarchical menu encompasses a plurality of different regions, the intermediate level hierarchical menu encompasses a plurality of groups of different areas with a respective one of the plurality of groups of different areas being contained within a respective one of the plurality of different regions and the low level hierarchical menu encompasses a plurality of groups of different sites with a respective one of the plurality of groups of different sites being contained within a respective one of the groups of different areas.

2. The image processing apparatus according to claim 1, wherein the storing device is a hard disk.

3. The image processing apparatus according to claim 1, wherein the sightseeing information displayed on the display unit includes character information describing the predetermined sightseeing site and a template image corresponding to the predetermined sightseeing site.

4. The image processing apparatus according to claim 3, wherein the display means replaces the displayed template image with an image obtained as a result of capturing an image using the image-capturing means.

5. The image processing apparatus according to claim 1, further comprising:
    position detection means for detecting a current position,
    wherein the detection means detects sightseeing information corresponding to the position detected by the position detection means.

6. The image processing apparatus according to claim 1, further comprising:
    acquisition means for fully or selectively obtaining sightseeing information from an external device storing sightseeing information.

7. A method of image processing comprising the steps of:
    storing sightseeing information in a storing device;
    detecting sightseeing information corresponding to a predetermined sightseeing site stored in the storing device;
    displaying the sightseeing information detected in the detecting step on a display unit; and
    capturing an image of an object,
    wherein, in the storing step, an image obtained as a result of capturing an image in the capturing step is linked to the sightseeing information detected in the detecting step and is stored and
    wherein the sightseeing information is stored in a series of hierarchical menus including a high level hierarchical menu, an intermediate level hierarchical menu and a low level hierarchical menu such that the high level hierarchical menu encompasses a plurality of different regions, the intermediate level hierarchical menu encompasses a plurality of groups of different areas with a respective one of the plurality of groups of different areas being contained within a respective one of the plurality of different regions and the low level hierarchical menu encompasses a plurality of groups of different sites with a respective one of the plurality of groups of different sites being contained within a respective one of the groups of different areas.

8. A computer readable medium tangibly embodying computer-executable instructions that when executed by a computer performs steps, the comprising:
    storing sightseeing information in a storing device;
    detecting sightseeing information corresponding to a predetermined sightseeing site stored in the storing device;
    displaying the sightseeing information detected in the detecting step on a display unit; and
    capturing an image of an object,
    wherein, in the storing step, an image obtained as a result of capturing an image in the capturing step is linked to the sightseeing information detected in the detecting step and is stored and
    wherein the sightseeing information is stored in a series of hierarchical menus including a high level hierarchical menu, an intermediate level hierarchical menu and a low level hierarchical menu such that the high level hierarchical menu encompasses a plurality of different regions, the intermediate level hierarchical menu encompasses a plurality of groups of different areas with a respective one of the plurality of groups of different areas being contained within a respective one of the plurality of different regions and the low level hierarchical menu encompasses a plurality of groups of different sites with a respective one of the plurality of groups of different sites being contained within a respective one of the groups of different areas.

9. An image processing apparatus comprising:

a storage unit configured to store sightseeing information in a storing unit;

a detection unit configured to detect sightseeing information corresponding to a predetermined sightseeing site stored in the storing device;

a display unit configured to display the sightseeing information detected by the detection means on a display unit; and an image-capturing unit configured to capture an image of an object, wherein the storage unit links an image obtained as a result of capturing an image using the image-capturing unit to the sightseeing information detected by the detecting unit and stores the image and wherein the storage unit stores the sightseeing information in a series of hierarchical menus including a high level hierarchical menu, an intermediate level hierarchical menu and a low level hierarchical menu such that the high level hierarchical menu encompasses a plurality of different regions, the intermediate level hierarchical menu encompasses a plurality of groups of different areas with a respective one of the plurality of groups of different areas being contained within a respective one of the plurality of different regions and the low level hierarchical menu encompasses a plurality of groups of different sites with a respective one of the plurality of groups of different sites being contained within a respective one of the groups of different areas.

* * * * *